Oct. 29, 1935.    R. B. LEWIS    2,019,313
STRESS-STRAIN CONTROL FOR RECORDING INSTRUMENTS
Filed July 28, 1932    2 Sheets-Sheet 2
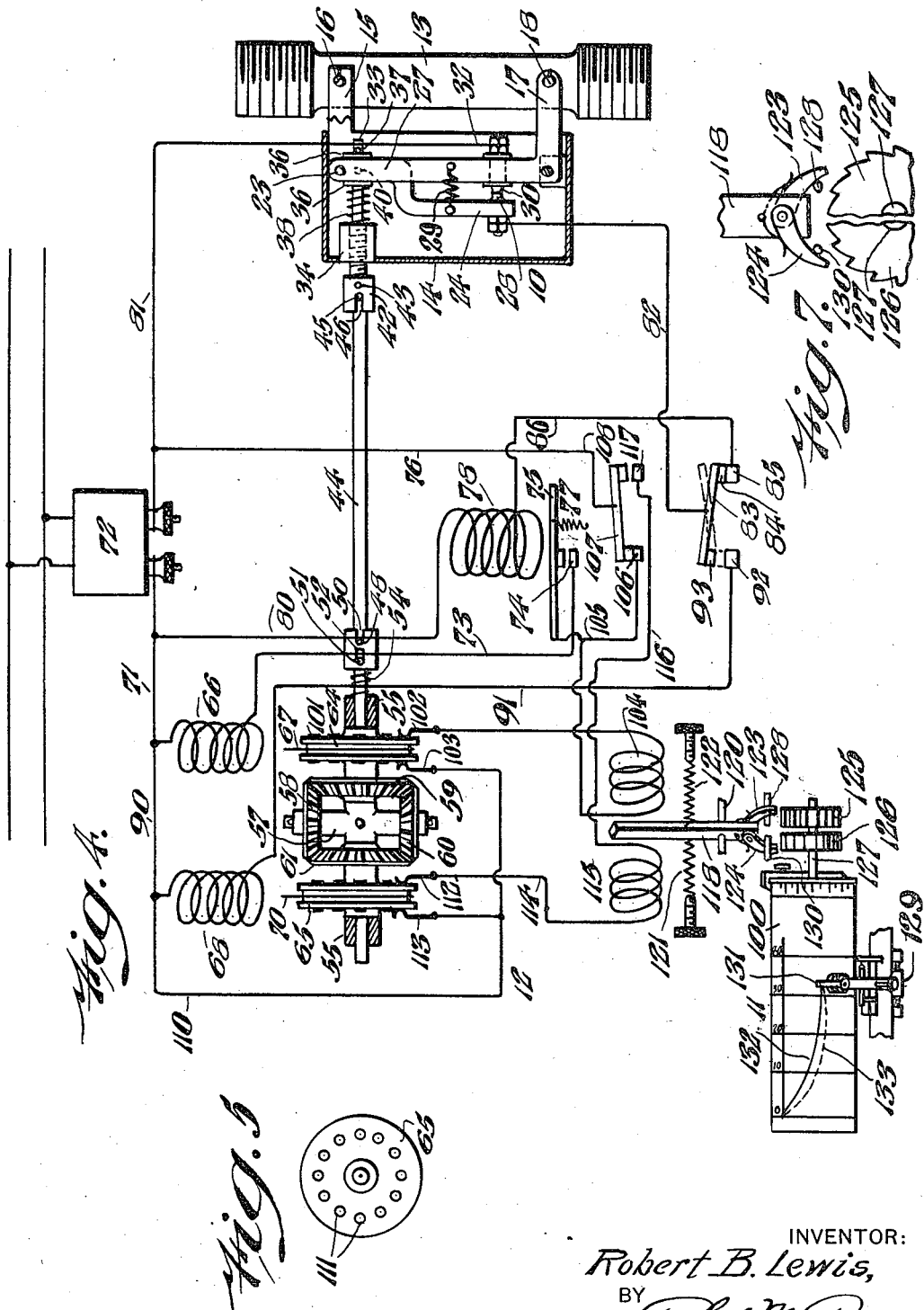
INVENTOR:
Robert B. Lewis,
BY
ATTORNEY Patented Oct. 29, 1935

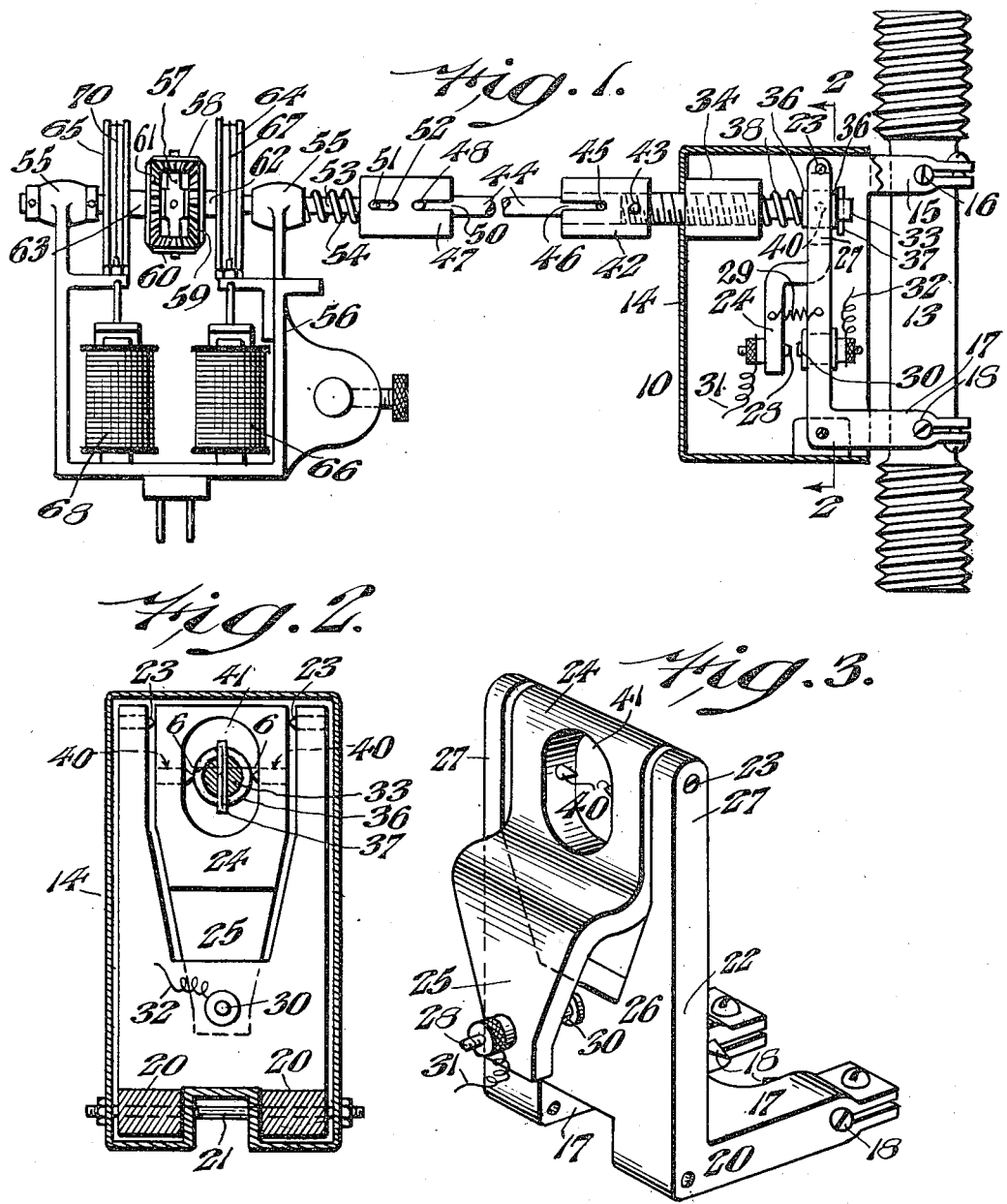

2,019,313

UNITED STATES PATENT OFFICE 2,019,313

STRESS-STRAIN CONTROL FOR RECORDING INSTRUMENTS

Robert B. Lewis, Philadelphia, Pa., assignor to Tinius Olsen Testing Machine Company, Philadelphia, Pa., a corporation of Pennsylvania Application July 28, 1932, Serial No. 625,554

4 Claims. (Cl. 265—2)

The present invention relates to testing apparatus and more particularly to a mechanism for translating variations of a test piece under strain into an exact and accurate stress strain diagram for record purposes.

In recording devices heretofore known it has been proposed to produce a stress strain diagram by apparatus controlled by the specimen under test and utilizing electrical control circuits which are dependent upon the opening and closing of contacts for operation of the circuits. Due to angularity of moving parts it has been found that irregular wear of the contacts takes place to such an extent that the initial setting and relation of the contacts vary and therefore the proportionate translation of test piece movement into a stress strain curve is no longer a definite known factor. The errors introduced by this variation can be neither foreseen nor allowed for. Furthermore such prior devices are limited in useful scope by the fact that the recording mechanism forms a part of the unitary translating means and so encumbers the latter as to introduce factors of error.

Some of the objects of the present invention are to provide an improved apparatus for testing and recording tension and compression strains in a piece under test; to provide a stress strain translating apparatus wherein electrical control contacts are always maintained in predetermined operative relation; to provide a translating apparatus wherein errors due to electrical contact variation and wear are eliminated; to provide a stress strain translating apparatus as a unit separate from a recording mechanism and whereby the latter is accurately and effectively operated at a location remote from the translating apparatus; and to provide other improvements as will hereinafter appear.

In the accompanying drawings Fig. 1 represents a side elevation of a stress strain apparatus embodying one form of the present invention, the same being shown attached to a test piece; Fig. 2 represents a section on line 2—2 of Fig. 1; Fig. 3 represents a perspective detail of the lever contact control construction; Fig. 4 represents a schematic assembly of the apparatus, the control circuits, and record mechanism; Fig. 5 represents an elevation showing the commutator wheel construction; Fig. 6 represents a detail section on line 6—6 of Fig. 2; and Fig. 7 represents a detail in elevation of the recorder operating mechanism.

Referring to the drawings one form of the present invention consists generally of three associated units, namely: a stress strain instrument 10, a recording mechanism 11, and a control apparatus 12. In the preferred form of the invention the recording mechanism 11 is remote from the stress strain instrument 10 and therefore is only indirectly connected therewith and hence leaves the instrument unencumbered with the accessory it controls.

For the purpose of making a test for elongation of a test specimen under tension, the stress strain instrument 10 is arranged to be attached to a test piece such as the member 13, which has its ends gripped by suitable jaws forming a part of the testing machine not here necessary to illustrate or describe. As here shown the instrument 10 consists of a body part 14 having at one end an outwardly projecting bifurcated clamping element 15 designed to straddle the test piece 13 and be rigidly fixed thereto by threaded clamping pins 16. When these pins 16 are adjusted in clamping relation at diametrically opposite portions of the test piece 13, the body 14 is made fast to one end of the test piece 13 and in operative condition generally parallels the axis of the test piece. Suitably spaced from the clamping element 15 and at a known distance therefrom, generally taken as two inches, there is a second bifurcated clamping element 17 which likewise straddles the test piece 13 and is rigidly made fast thereto by threaded clamping pins 18. In this instance the bifurcated element 17 forms the short arm of a bell crank lever 20 which is arranged to move relative to the body 14 by mounting it upon a pivot rod 21 which extends transversely of the body 14. The long arm 22 of the lever 20 extends generally parallel to the test piece 13 and carries at its upper end two pivots 23 from which an arm 24 is suspended having an offset portion 25 forming a parallel extension of the arm 24. This extension also normally parallels the opposed face of the lever 20. To make this clear it will be seen from Fig. 3 that the long arm of the bell crank lever 20 comprises a plane body portion 26 from which extend two supporting arms 27 designed to receive the arm 24 between them and pivotally support it by means of the two coaxially arranged pivots 23. The free end of the arm 24 is provided with a contactor 28 arranged opposite to and coaxial with respect to a contact 30 which is fixed to the body portion 26 of the lever 20. Both the contactor 28 and contact 30 are adjustably mounted upon their respective parts and each is included as the terminal of a control circuit by the respective lead wires 31 and 55

32. It should also be noted that the pivoted assembly of the bell crank 20 and arm 24 is such that turning movement of the lever 20 in either direction about its pivot 21 will cause a following movement of the arm 24 so controlled as will maintain the opposed plane faces of the contactor 28 and contact 30 in parallel relation. In other words the making or breaking of a control circuit by the bringing together of the two contact elements, or by separating the two contact elements, will always take place with the face of one contact parallel to the face of the other. There is thus no opportunity for burning or wearing away of one side of the contact such as will and has heretofore introduced a serious error factor. A spring 29 is interposed between the parts 25 and 26 to take up any lost motion.

Since the preferred form of the invention depends upon a succession of electrical impulses for the successful measurement and recording of variations in length of the test piece and since these electrical impulses are directly controlled by the making or breaking of the circuit including the contactor 28 and contact 30, provision is made for closing the gap between the contactor 28 and contact 30 when the device is working on a break contact control, and for reestablishing a gap if the device is working upon a closed contact control. To that end one means of accomplishing such action consists of a rod 33 having threaded engagement with a boss 34 which is fixedly supported on the body 14 in such a position as to axially dispose the rod 33 substantially perpendicular to the test piece 13. This rod 33 carries a bushing 35 which is located between washers 36, one of which is arranged in abutting relation to a pin 37 which passes transversely through the rod 33 with its ends projecting at opposite sides thereof. The other washer 36 serves as the end follower of a coil spring 38 which is compressed between the aforesaid washer 36 and the boss 34. The arrangement is such that the axial movement of the rod 33 in either direction will be transmitted to the bushing 35 which in turn rocks the arm 24 on its pivots 23 through the medium of pivot pins 40 fixed to the arm 24 and projecting from opposite sides of an opening 41 provided in the arm 24 for the reception of the bushing 35 and the passage of the rod 33. The pivots 40 thus become the fulcrum for the arm 24 and the latter is operated whenever the lever 20 is rocked in either direction. Also movement of the rod 33 in one direction or the other will shift the fulcrum point 40 to restore the initial parallel relation of the arm 24 to the lever 20.

For causing linear movement of the rod 33 in both directions its threaded end projects from the body casing 14 and is attached to a socket 42 by a pin 43, and the socket 42 in turn is arranged to receive the end of a flexible or propeller shaft 44 driven from a mechanism presently to be described. Rotary motion of the shaft 44 is transmitted to the socket 42 in this instance by the ends of a pin 45 projecting from opposite sides of the shaft 44 and riding in oppositely disposed slots 46 respectively of the aforesaid socket 42. The opposite end of the shaft 44 is similarly connected to a coupling sleeve 47 by a pin and slot connection 48 and 50, and the coupling 47 in turn is driven by a slot and pin connection 51 and 52 from a driving shaft 53. The pin and slot connection of the coupling 47 and the shaft 53 allows suitable relative movement between the two parts and a coil spring 54 holds the coupling in its engaged connection with the shaft 44. The driving shaft 53 is journalled in suitable bearings 55 of a motor frame 56 and receives motion from a driving member 57 by means of a train of bevelled gears 58, 59, 60 and 61, the two oppositely disposed gears 59 and 61 being respectively attached to sleeves 62 and 63, which are loose upon the shaft 53. The sleeve 62 has keyed or otherwise secured thereto a driven commutator wheel 64, and the sleeve 63 is likewise keyed or otherwise secured to a second commutator wheel 65. The commutator wheel 64 is arranged to be rotated in one direction by a motor 66 which operates through a drive cord 67 to produce, through a succession of impulses, a substantially continuous rotation of the wheel 64. The wheel 65 is similarly driven by a like motor 68 operating upon a cord 70 arranged to rotate the wheel 65 in a direction opposite that given to the wheel 64. It will thus be seen if the motor 66 is operated that the shaft 53 will be rotated in one direction, but if the motor 68 is operated the shaft 53 will be rotated in the opposite direction. The transmission of motion from the driven commutator wheel to the shaft 53 is by way of an epicyclic gearing wherein rotation of the gear 59, while the gear 61 remains stationary, causes the driven member 57 to rotate in the same direction as the gear 59 but at one-half the speed. The reverse operation takes place when the gear 61 is rotated and the gear 59 is stationary.

As here shown the motor 66 is arranged to be energized and actuated for recording purposes when the contactor 28 and contact 30 are separated by the movement of the lever 20 under the elongation of the test piece by tension produced by a gradually increasing force. Where hysteresis effect is to be determined the gradual lessening of the tension force reverses the movement of the lever 20 and hence for proper recording purposes the motor 68 is brought into operation in place of the motor 66 and is energized and operated when the contactor 28 and contact 30 are brought together. The circuit for motor 66 will first be described. One terminal of the coil of the motor 66 leads by a conductor 71 to one terminal of a source of current such for example as that supplied from a transformer 72 where the source is alternating current. The other terminal of the coil of the motor 66 leads by way of a conductor 73, contact 74, relay armature 75, conductor 105 through switch 107 and conductor 108 to the opposite pole of the transformer 72. A spring 77 normally maintains the circuit of the motor 66 closed, while a relay magnet 78, when energized, breaks the circuit. The magnet 78 is in a circuit including conductor 80 leading to one pole of the transformer 72, a conductor 81 leading from the other pole of the transformer 72 to the contact 30, contactor 28, and a conductor 82 leading to a manually operated selector switch 83. A contactor 84 on the switch 83 is arranged to contact with a contact 85, when the switch 83 is set for control by the motor 66, and a conductor 86 leads from contact 85 to the magnet 78. Assuming that the switch 83 is set to bring the contactor 84 and contact 85 together; that contactor 28 and contact 30 are together; and that a force acting in tension is applied to the test piece; then the elongation of the test piece 13 will cause the lever 20 to turn in a clockwise direction to break the circuit through relay magnet 78 due to the withdrawal of contact 30 from contactor 28. The deenergizing of relay 78 allows armature 75 to be drawn by spring 77 into contact with contact 74 to close the circuit including conductor 71, motor 66, conductors 73, 105 and 76, and the source of current. An impulse will thereby be transmitted through the cord 67 to turn the commutator wheel 64 in the direction to cause the bevel gear train to rotate the shaft 44 and sleeve 42 to produce linear travel of the rod 33 in the direction to turn the arm 24 in a counter-clockwise direction. This movement of the arm 24 brings the contactor 28 again against the contact 30 and restores the circuit through the relay 78 with the consequent breaking of the circuit to the motor 66. Since the tension pull causes a substantially continuous elongation, the breaking and making of the control circuit at the contacts 28 and 30 causes the motor 66 to function with the required vibratory action and hence the shaft 44 has a substantially continuous rotation.

For operating the motor 68 it is included in a circuit having a conductor 90 joined to conductor 71, and a conductor 91 leading to a contact 92 located to be engaged by the contactor 93 of the switch 83 when the latter is thrown to break the contact with contact 85. This circuit is rendered operative when the contacts 28 and 30 are together and therefore to break the engagement of such contacts the rod 33 has to move in the direction to move the arm 24 away from the lever 26, namely in the opposite direction to which it did when the circuit of motor 66 was operative. Also it should be noted that the circuit of motor 68 is selected for reverse tension test or for hysteresis readings, during which the test piece retracts to cause the lever 20 to turn in a counter-clockwise direction. During such reverse operation it is necessary to stop the motor 66, this being accomplished by manually shifting the switch 107 in conjunction with the switch 83 so that the circuit of motor 66 is broken at the contact 106. With the switch 83 in the dotted line position of Fig. 4, and switch 107 out of contact with contact 106, the circuit to motor 66, by way of conductors 76, 105 and 73 is broken. Also the contactor 93 engages contact 92 to throw the circuit of motor 68 under the control of the contacts 28 and 30 which are initially open. The lessening of the strain upon the test piece is evidenced by a retraction which swings the lever 20 in a counter-clockwise direction so that the contact 30 engages the contactor 28. When this occurs the circuit is closed and an operating impulse of the motor 68 is transmitted through the wheel 65 and gearing to rotate the shafts 53 and 44 in a direction to cause the rod 33 to be fed to the left as seen in Figs. 1 and 4. The rod 33 so moving shifts the fulcrum of the arm 24 and the latter then swings about 23 as a pivot and causes the contactor 28 to be moved away from the contact 30 and thereby break the circuit of motor 68. Since the retraction takes place as a substantially continuous motion it is evident that the making and breaking of the circuit will cause a succession of impulses so closely periodic as to give a substantially continuous motion to the rod 33.

For causing the cylinder 100 of the recording instrument to rotate in accordance with the motion transmitted to either of the wheels 64 or 65, and which motion is a direct measure of test piece change of length, the wheel 64 is provided with pins 101 passing through the wheel to form two circular rows of contacts respectively at opposite sides of the wheel, one row being arranged to pass beneath a fixed spring terminal brush 102, and the other beneath a like fixed spring terminal brush 103. The circumferential spacing of the pins 101 is such as to permit the brushes to rest between two pins after each operating impulse. The brush 102 forms the terminal of an electric circuit including a solenoid coil 104, a conductor 105, leading to a contact 106, a pivoted bridging switch arm 107, conductor 108 leading to conductor 76, source of current 72, and conductor 110 back to the brush 103. The wheel 65 is similarly provided with pins 111 having the same arrangement for engagement with two terminal brushes 112 and 113, which are in a circuit including a conductor 114, solenoid 115, conductor 116 to contact 117, bridge switch arm 107, conductors 108 and 76, source of current 72, and conductor 110 to the brush 113. The selected position of the control switch arm 83 which is synchronous with the solenoid switch arm 107 determines which solenoid coil is to be operated. An armature 118 is pivoted for rocking movement on a suitable journal 120 which is disposed between the solenoid coils 104 and 115 so that when one coil is energized, it will rock in one direction, and when the other is energized, it will rock in the opposite direction. Springs 121 and 122 are suitably mounted to act upon the armature 118 from opposite sides, and are so adjusted as to normally hold the armature balanced between the solenoid coils. The opposite ends of the armature 118 pivotally carry two pawls 123 and 124, oppositely arranged for respectively imparting step by step movement to two ratchets 125 and 126. These ratchets are keyed or otherwise made fast to the shaft 127 of the recording cylinder 100, and the teeth of one ratchet are oppositely arranged with respect to the other ratchet to correspond to the action of the pawls 123 and 124. A pin 128 is fixedly mounted in position to disengage the pawl 123 from its ratchet 125 when the armature 118 is in its middle or initial position, and the location of the pin 128 with respect to the ratchet 125 is also such as to prevent the pawl 123 from engaging its ratchet when the pawl 124 is turning the ratchet 126. Likewise a pin 130 is located and operates similarly upon the pawl 124. Thus when the armature lever 118 is rocking in the direction to advance the ratchet 125 to turn the shaft 127 in a clockwise position, the pin 130 holds the pawl 124 away from the ratchet 126 during the full stroke of pawl 123 so that the shaft 127 will not be turned counter-clockwise during the non-working stroke of the pawl 123. The shaft 127 causes the cylinder 100 to rotate so that the recording pencil, stylus, or other marking element 131 will reproduce upon the record sheet of the cylinder 100 an indication corresponding to the strain of the test piece. The stylus 131 is mounted upon a carriage 129 for travelling movement axially of the record cylinder and this feeding movement takes place in definite relation to the stress imposed by the machine upon the test piece. Any well known means can be employed to carry out this feeding of the stylus since these details form no part of the present invention, and as an example of an operative structure attention is here directed to patent to Smith No. 1,855,613. It will thus be seen when the stress on the piece 13 is increasing that motor 66 will be operating and the transmitted impulses of the solenoid 104 will cause the record cylinder 100 to travel in a clockwise direction to produce the stress-strain curve 132 as the stylus 131 travels to the right as seen in Fig. 4. When the stress on the piece 13 is decreasing, after having reached a predetermined maximum, the selecting switches 83 and 107 are set so that the motor 68 will operate and the transmitted impulses of the solenoid 115 will cause the record cylinder 100 to travel in a counter-clockwise direction to produce a stress-strain curve which may be represented as 133.

It will now be apparent that a complete unitary stress-strain recording system has been devised wherein the making and breaking of a control circuit under strain conditions is utilized as an accurate measure of test conditions and recorded as such. As a part of the control circuits contacts are so arranged and relatively placed as to maintain the predetermined set condition of such contacts under all operating movements and thereby prevent the introduction of error factors caused by wear and disturbed adjustment.

In connection with the gear driven control of the propeller shaft 44 it should be noted that only one motor either 66 or 68 is operable at a time and that the inoperative motor acts as an anchor or fixed part about which the operating part moves. This action is accomplished without the use of any additional mechanisms and is a valuable feature in that in changing from one motor drive to the other or rather from one type of test to another it makes possible a change in electrical control only with no further mechanical adjustment of the parts. It will also be noted that the term "motor" used throughout the specification and claims is in its generic sense and is not to be construed as limiting the invention to the specific type of dead beat motor here shown by way of example.

While only a single form is shown in which this invention may be embodied, it is to be understood that the invention is not limited to any specific construction, but might be applied to various forms without departing from the spirit of the invention or the scope of the appended claims.

Having thus described my invention, I claim:

1. A stress-strain mechanism comprising a strain detecting means including a body arranged to be attached to a test piece and a lever pivoted to said body and also arranged to be attached to said test piece, an electrical control circuit including two terminals, one of said terminals being mounted on said lever, a contactor arm carrying said second terminal, means separate from said lever forming a fulcrum for said arm, a connection between said arm and lever to operate said arm under movement of said lever, and means to shift said fulcrum after a movement of said lever to restore the initial relation of said terminals to each other.

2. A stress-strain mechanism comprising a strain detecting means including a body arranged to be attached to a test piece and a lever pivoted for movement relative to said body and also arranged to be attached to said test piece, a contact carried by said lever, a restoring means, an arm pivoted at one point to said lever and at another point to said restoring means, a contactor carried by said arm for engaging said contact, and electrically operated means including a circuit having said contactor and contact as terminals for operating said restoring means to restore the initial relation of said contactor and contact after movement of said lever in response to a change in length of said test piece.

3. A stress-strain mechanism comprising the combination of an electric circuit, two terminals therefore, separate pivoting means for respectively mounting said terminals in opposed relation, means responsive to change in length of a test piece for actuating said terminals to control said circuit, and means coacting with said pivoting means and controlled by said circuit for restoring the initial relation of said terminals after each movement of said terminals in response to test piece variation.

4. A stress-strain mechanism comprising a strain detecting means including a body arranged to be attached to a test piece and a lever pivoted to said body and also arranged to be attached to said test piece, an electric circuit terminal contact carried by said lever, an electric circuit terminal contactor, an arm mounting said contactor and pivoted to said lever to position said contactor in coaxial relation with said contact, and means acting upon one of said members for restoring the initial relation between said contact and contactor after a variation in length of said test piece.

ROBERT B. LEWIS.